United States Patent
Xie

(10) Patent No.: US 11,977,604 B2
(45) Date of Patent: May 7, 2024

(54) METHOD, DEVICE AND APPARATUS FOR RECOGNIZING, CATEGORIZING AND SEARCHING FOR GARMENT, AND STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Hongbin Xie, Beijing (CN)

(73) Assignees: Beijing Jingdong Shangke Information Tech Co., Ltd, Beijing (CN); Beijing Jingdong Century Trading Co., Ltd., Beijing (CN)

( * ) Notice: Subject to any disclaimer, the term of this patent is extended or adjusted under 35 U.S.C. 154(b) by 375 days.

(21) Appl. No.: 17/295,337

(22) PCT Filed: Dec. 23, 2019

(86) PCT No.: PCT/CN2019/127660
§ 371 (c)(1),
(2) Date: May 19, 2021

(87) PCT Pub. No.: WO2020/168814
PCT Pub. Date: Aug. 27, 2020

(65) Prior Publication Data
US 2022/0019840 A1    Jan. 20, 2022

(30) Foreign Application Priority Data
Feb. 18, 2019    (CN) .......................... 201910123577.4

(51) Int. Cl.
   *G06F 18/22*    (2023.01)
   *G06F 18/211*    (2023.01)
   (Continued)

(52) U.S. Cl.
   CPC ............ *G06F 18/22* (2023.01); *G06F 18/211* (2023.01); *G06N 3/045* (2023.01); *G06N 3/08* (2013.01); *G06V 10/40* (2022.01)

(58) Field of Classification Search
CPC ....... G06F 18/22; G06F 18/211; G06V 10/40; G06N 3/045; G06N 3/08
See application file for complete search history.

(56) References Cited

U.S. PATENT DOCUMENTS 10,096,122 B1    10/2018    Agrawal et al.
11,631,193 B1 *    4/2023    Akbas .................... G06N 3/045
                                                                                                                      382/103
(Continued)

FOREIGN PATENT DOCUMENTS

CN    105447529 A    3/2016
CN    106874924 A    6/2017
(Continued)

OTHER PUBLICATIONS

Wang, Wenguan, et al. "Attentive fashion grammar network for fashion landmark detection and clothing category classification." Proceedings of the IEEE conference on computer vision and pattern recognition. 2018. (Year: 2018).*
(Continued)

*Primary Examiner* — Utpal D Shah
(74) *Attorney, Agent, or Firm* — Finch & Maloney PLLC

(57) ABSTRACT

A method, device and apparatus for recognizing, categorizing and searching for a garment, and a storage medium. The method for recognizing a garment comprises: acquiring a target image containing a garment to be recognized, and determining, on the basis of the target image, a set of heat maps corresponding to key feature points contained in the target image, the set of heat maps comprising position probability heat maps corresponding to the respective key feature points contained in the target image (101); and
(Continued)

processing the set of heat maps on the basis of a shape constraint corresponding to the target image, and determining position probability information of the key feature points contained in the target image (102).

18 Claims, 7 Drawing Sheets

(51) Int. Cl.
*G06N 3/045* (2023.01)
*G06N 3/08* (2023.01)
*G06V 10/40* (2022.01)

(56) References Cited

U.S. PATENT DOCUMENTS

| 2015/0127592 | A1 | 5/2015 | Yan et al. | |
| 2018/0096069 | A1 | 4/2018 | Yan et al. | |
| 2018/0165548 | A1* | 6/2018 | Wang | G06F 18/214 |
| 2018/0268220 | A1* | 9/2018 | Lee | G06V 10/454 |
| 2018/0276495 | A1 | 9/2018 | Yu et al. | |
| 2019/0171871 | A1* | 6/2019 | Zhang | G06V 40/103 |
| 2019/0213388 | A1* | 7/2019 | Makeev | G06V 10/82 |
| 2019/0279014 | A1* | 9/2019 | Fang | G06T 3/40 |
| 2020/0252600 | A1* | 8/2020 | Tseng | G06V 10/764 |
| 2021/0049353 | A1* | 2/2021 | Bian | G06N 3/04 |
| 2022/0108468 | A1* | 4/2022 | Nakamura | G06V 40/103 |

FOREIGN PATENT DOCUMENTS

| CN | 108229496 A | 6/2018 |
| CN | 108256431 A | 7/2018 |
| CN | 108549844 A | 9/2018 |
| CN | 108932495 A | 12/2018 |
| CN | 109166147 A | 1/2019 |
| CN | 109325952 A | 2/2019 |

OTHER PUBLICATIONS

Wang Wenguan et al: "Attentive Fashion Grammar Network for Fashion Landmark Detection and Clothing Category Classification", 2018 IEEE/CVF Conference on Computer Vision and Pattern Recognition, IEEE, Jun. 18, 2018 (Jun. 18, 2018), pp. 4271-4280, XP033476400, DOI: 10.1109/CVPR.2018.00449 [retrieved on Dec. 14, 2018].
International Search Report Corresponding to PCT/CN2019/127660 dated Mar. 25, 2020.
Written Opinion Corresponding to PCT/CN2019/127660 dated Mar. 25, 2020.
Bulat Adrian et al: "Human Pose Estimation via Convolutional Part Heatmap Regression", Sep. 16, 2016 (Sep. 16, 2016), Computer Vision—ECCV 2020: 16th European Conference, Glasgow, UK, Aug. 23-28, 2020: Proceedings; Part of the Lecture Notes in Computer Science; ISSN 0302-9743; [Lecture Notes in Computer Science; Lect. Notes Computer], Springer International PU, XP047565843.
Supplementary European Search Report in the European application No. 19915612.6, dated Dec. 8, 2021.

* cited by examiner

METHOD, DEVICE AND APPARATUS FOR RECOGNIZING, CATEGORIZING AND SEARCHING FOR GARMENT, AND STORAGE MEDIUM

CROSS-REFERENCE TO RELATED APPLICATIONS

The application is based on and claims priority to Chinese Patent Application No. 201910123577.4 filed on Feb. 18, 2019, the contents of which are incorporated herein by reference in their entirety.

TECHNICAL FIELD

The disclosure relates to the technical field of computer vision, and in particular, to a method, device and apparatus for garment recognition, categorization and searching, and a storage medium.

BACKGROUND

Garment recognition is one of the most important and challenging problems in the field of image retrieval. In today's Internet, most of the searches by users relate to online shopping content and garment. Thus, the garment recognition is a key issue in addressing searching the same item, style recognition and wearing recommendation requirements.

SUMMARY

The main object of the disclosure is to provide a method, device and apparatus for garment recognition, categorization and searching, and a storage medium, which can recognize a garment more accurately.

In order to achieve the above object, the technical solutions of the disclosure are realized as follows.

According to a first aspect, an embodiment of the disclosure provides a method for garment recognition, the method includes the following operations:

a target image containing a garment to be recognized is acquired, and a set of heat maps corresponding to key feature points contained in the target image is determined based on the target image, the set of heat maps includes position probability heat maps respectively corresponding to the key feature points contained in the target image;

the set of heat maps is processed based on a shape constraint corresponding to the target image, and position probability information of the key feature points contained in the target image is determined.

According to a second aspect, an embodiment of the disclosure provides a method for garment categorization implemented by using the method for garment recognition according to any one of the embodiments of the disclosure, the method includes the following operations:

a category attribute of the garment is determined based on the position probability information of the key feature points contained in the target image; herein the category attribute includes one of a shape, a layout or a style;

a corresponding category of the garment is determined based on the category attribute.

According to a third aspect, an embodiment of the disclosure provides a method for garment searching implemented by using the method for garment recognition according to any one of the embodiments of the disclosure, the method includes the following operations:

a category attribute of the garment is determined based on the position probability information of the key feature points contained in the target image; herein the category attribute includes one of a shape, a layout or a style;

a corresponding search element is determined based on the category attribute; herein the search element includes at least one of a search keyword or an image;

a set of garment images corresponding to the target image is searched based on the search element.

According to a fourth aspect, an embodiment of the disclosure provides a device for a garment recognition, the device includes:

a first acquisition subsystem configured to acquire a target image containing a garment to be recognized.

a first image processing subsystem configured to determine, based on the target image, a set of heat maps corresponding to key feature points contained in the target image, the set of heat maps including position probability heat maps respectively corresponding to the key feature points contained in the target image; and to process the set of heat maps based on a shape constraint corresponding to the target image to determine position probability information of the key feature points contained in the target image.

According to a fifth aspect, an embodiment of the disclosure provides a device for garment categorization, the device includes:

a second acquisition subsystem configured to acquire a target image containing a garment to be recognized;

a second image processing subsystem configured to determine, based on the target image, a set of heat maps corresponding to key feature points contained in the target image, the set of heat maps including position probability heat maps respectively corresponding to the key feature points contained in the target image; and to process the set of heat maps based on a shape constraint corresponding to the target image to determine position probability information of the key feature points contained in the target imag;

a categorizing subsystem configured to determine a category attribute of the garment based on the position probability information of the key feature points contained in the target image; herein the category attribute includes one of a shape, a layout or a style; and to determine a corresponding category of the garment based on the category attribute.

According to a sixth aspect, an embodiment of the disclosure provides a device for garment searching, the device includes:

a third acquisition subsystem configured to acquire a target image containing a garment to be recognized;

a third image processing subsystem configured to determine, based on the target image, a set of heat maps corresponding to key feature points contained in the target image, the set of heat maps including position probability heat maps respectively corresponding to the key feature points contained in the target image; and to process the set of heat maps based on a shape constraint corresponding to the target image to determine position probability information of the key feature points contained in the target image;

a search element determination subsystem configured to determine a category attribute of the garment based on the position probability information of the key feature points contained in the target image; herein the category attribute includes one of a shape, a layout or a style; and to determine a corresponding search element based on the category attribute; herein the search element includes at least one of a search keyword or an image;

a search subsystem configured to search a set of garment images corresponding to the target image based on the search element.

According to a seventh aspect, an embodiment of the disclosure provides a computer device including a processor and a memory configured to store a computer program executable on the processor.

Herein the processor is configured to implement the method for garment recognition, or the method for garment categorization, or the method for garment searching provided according to any one of the embodiments of the disclosure when executing the computer program.

According to an eighth aspect, an embodiment of the disclosure provides a computer storage medium having stored thereon a computer program, herein the computer program implements the method for garment recognition, or the method for garment categorization, or the method for garment searching provided according to any one of the embodiments of the disclosure when being executed by a processor.

The method, device and apparatus for for garment recognition, categorization and searching, and the storage medium provided according to the embodiments of the disclosure, acquire a target image containing a garment to be recognized, and determine, based on the target image, a set of heat maps corresponding to key feature points contained in the target image, the set of heat maps includes position probability heat maps respectively corresponding to the key feature points contained in the target image; in this way, initial position information of each of the key feature points in the target image of the garment to be recognized is acquired, and initial position probability heat maps respectively corresponding to the key feature points are obtained; and the set of heat maps is processed based on a shape constraint corresponding to the target image, and position probability information of the key feature points contained in the target image is determined. In this way, the set of heat maps is processed based on the shape constraint corresponding to a part of the garment, so that the accurate recognition of the position probability of the key feature point contained in the garment to be recognized may be optimized, the accurate recognition of the garment may be implemented according to the determined position probability information of the key feature points of the garment to be recognized, and it may be applied more widely in the fields of online shopping, intelligent wearing, garment design etc., through the acquisition of the key feature points of the garment.

DETAILED DESCRIPTION

The disclosure will be described in further detail below with reference to the accompanying drawings and embodiments. It should be understood that the specific embodiments described herein are merely explanation of the disclosure and are not intended to limit the disclosure.

Unless defined otherwise, all technical and scientific terms used herein have the same meaning as commonly understood by those skilled in the art to which the disclosure belongs. The terms used in the specification of the disclosure are for the purpose of describing specific embodiments only and are not intended to limit the disclosure. As used herein, the term "and/or" includes any and all combinations of one or more of the relevant listed items.

Before the disclosure is described in further detail, the nouns and terms referred to in the embodiments of the disclosure are described, and the nouns and terms referred to in the embodiments of the disclosure are applicable to the following explanation.

1) An object image herein refers to an image for detecting key points of a garment, such as an image in various digital formats such as JPEG etc.

2) A training image is a sample image for image training.

3) A loss function, also known as a cost function, is an objective function of the neural work optimization.

4) A Neural Network (NN) is a complex network system formed by wide interconnection of a large number of simple processing units (called neurons). It reflects many basic features of human brain function and is a highly complex and nonlinear dynamic learning system.

Figure 1:
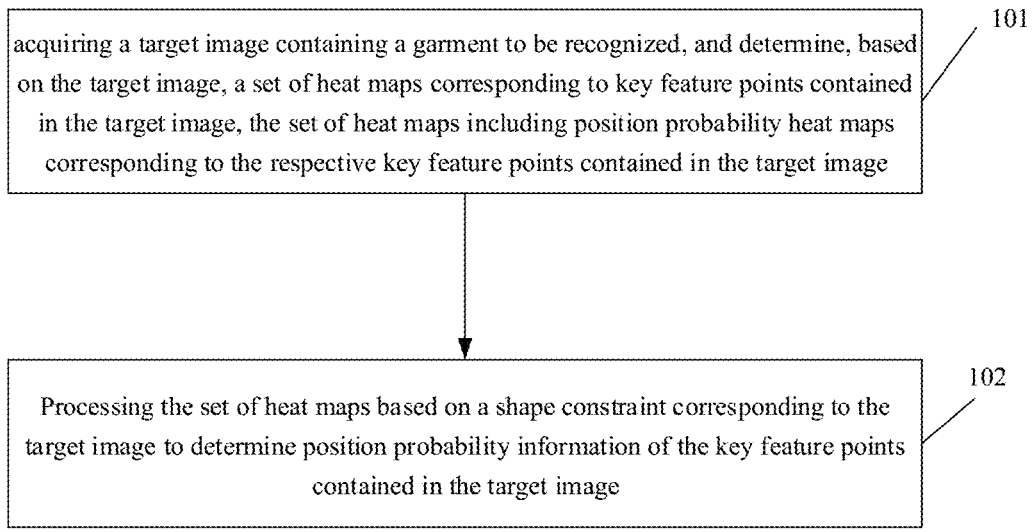
FIG. 1 is a schematic flow chart of a method for garment recognition provided according to an embodiment of the disclosure.

As illustrated in FIG. 1, an embodiment of the disclosure provides a method for garment recognition, the method is performed by a device for a garment recognition and includes the following operations.

In operation 101, a target image containing a garment to be recognized is acquired, and a set of heat maps corresponding to key feature points contained in the target image is determined based on the target image, the set of heat maps includes position probability heat maps respectively corresponding to the key feature points contained in the target image.

The target image refers to a picture taken or drawn under the requirement for detecting the key points of the garment. Determining the set of heat maps corresponding to key feature points contained in the target image based on the target image refers to capturing corresponding features contained in the target image, which contains the set of heat maps corresponding to the key feature points. Herein, the set of heat maps includes position probability heat maps respectively corresponding to the key feature points contained in the target image.

Figure 2A:
FIG. 2A is an example diagram of key feature points of a garment with a first garment type provided according to an embodiment of the disclosure.
Figure 2B:
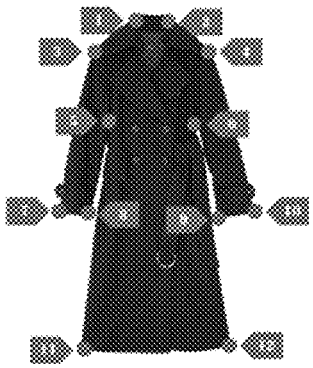
FIG. 2B is an example diagram of key feature points of a garment with a second garment type provided according to an embodiment of the disclosure.
Figure 2C:
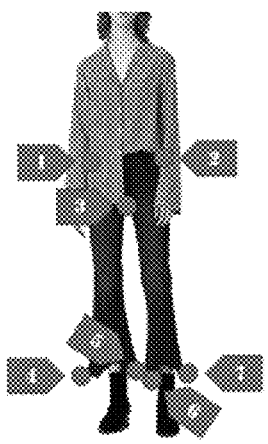
FIG. 2C is an example diagram of key feature points of a garment with a third garment type provided according to an embodiment of the disclosure.
Figure 2D:
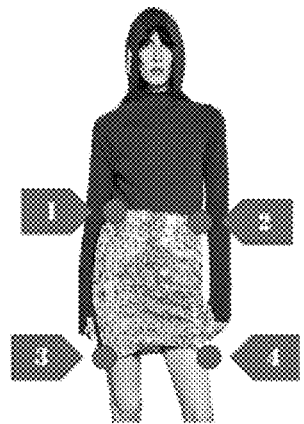
FIG. 2D is an example diagram of key feature points of a garment with a fourth garment type provided according to an embodiment of the disclosure.
Figure 2E:
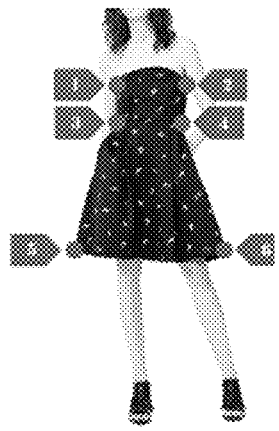
FIG. 2E is an example diagram of key feature points of a garment with a fifth garment type provided according to an embodiment of the disclosure.

Different garment types have different key points. The current system mainly accepts five garment types. The contained key feature points are determined by the five garment types respectively. FIG. 2A illustrates an example diagram of key feature points of a garment with a first garment type of the five garment types, the first garment type includes key feature points 1 to 13 of the garment, i.e., a total of 13 key feature points. FIG. 2B illustrates an example diagram of key feature points of a garment with a second garment type of the five garment types, the second garment type includes key feature points 1 to 12 of the garment, i.e., a total of 12 key feature points. FIG. 2C illustrates an example diagram of key feature points of a garment with a third garment type of the five garment types, the third garment type includes key feature points 1 to 7 of the garment, i.e., a total of 7 key feature points. FIG. 2D illustrates an example diagram of key feature points of a garment with a fourth garment type of the five garment types, the fourth garment type includes key feature points 1 to 4 of the garment, i.e., a total of 4 key feature points. FIG. 2E illustrates an example diagram of key feature points of a garment with a fifth garment type of the five garment types, the fifth garment type includes key feature points 1 to 6 of the garment, i.e., a total of 6 key feature points. Here, the key points of the garment are local locations that most of the garment in the category to which the garment belongs have and are available for distinguishing between different styles of garment in the garment category functionally and structurally, and each garment may have one or more key points.

The set of heat maps corresponding to the key feature points contained in the target image is determined, that is, initial position information of each of the key feature points of the target image is obtained, in particular, position probability heat maps respectively corresponding to the key feature points are obtained.

In operation 102, the set of heat maps is processed based on a shape constraint corresponding to the target image, and position probability information of the key feature points contained in the target image is determined.

The set of heat maps and the shape constraint corresponding to the target image are processed, the set of heat maps is optimized by the shape constraint, and the position probability information of the key feature points contained in the target image is determined.

Here, the shape constraint may be a constraint corresponding to a part of the garment, for characterizing key features of the part of the garment.

In the method for garment recognition provided according to the embodiment of the disclosure, a target image containing a garment to be recognized is acquired, and a set of heat maps corresponding to key feature points contained in the target image is determined based on the target image, the set of heat maps includes position probability heat maps respectively corresponding to the key feature points contained in the target image. In this way, initial position information of each of the key feature points in the target image of the garment to be recognized is acquired, and initial position probability heat maps respectively corresponding to the key feature points are obtained. And The set of heat maps is processed based on a shape constraint corresponding to the target image, and position probability information of the key feature points contained in the target image is determined. In this way, the set of heat maps is processed based on the shape constraint corresponding to a part of the garment, so that the accurate recognition of the position probability of the key feature point contained in the garment to be recognized may be optimized, the accurate recognition of the garment may be implemented according to the determined position probability information of the key feature points of the garment to be recognized, and it may be applied more widely in the fields of online shopping, intelligent wearing, garment design etc., through the acquisition of the key feature points of the garment.

In an embodiment, the determining, based on the target image, the set of heat maps corresponding to the key feature points contained in the target image includes the following operations:

the target image is processed through a trained first neural network, and the set of heat maps corresponding to the key feature points contained in the target image is determined;

the processing the set of heat maps based on the shape constraint corresponding to the target image includes the following operation;

the set of heat maps is processed through a trained second neural network based on the shape constraint corresponding to the target image.

Processing the target image through the trained first neural network refers to inputting the target image into the trained first neural network, and capturing corresponding features contained in the target image through the first neural network, which contains the set of heat maps corresponding to the key feature points, the set of heat maps includes position probability heat maps respectively corresponding to the key feature points contained in the target image.

The set of heat maps corresponding to the key feature points contained in the target image is determined by using the trained first neural network, that is, initial position information of each of the key feature points of the target image is obtained, in particular, position probability heat maps respectively corresponding to the key feature points are obtained.

The set of heat maps and the shape constraint corresponding to the target image are input into the trained second neural network, the set of heat maps is optimized by the shape constraint, and the position probability information of the key feature points contained in the target image is determined.

Here, the shape constraint may be a constraint corresponding to a part of the garment, for characterizing key features of the part of the garment.

In the above embodiment, the target image containing the garment to be recognized is acquired, the target image is processed through the trained first neural network, a set of heat maps corresponding to key feature points contained in the target image is determined, and the set of heat maps includes position probability heat maps respectively corresponding to the key feature points contained in the target image; in this way, initial position information of each of the key feature points in the target image of the garment to be recognized is acquired, and initial position probability heat maps respectively corresponding to the key feature points are obtained; the set of heat maps is processed through the trained second neural network based on a shape constraint corresponding to the target image, and position probability information of the key feature points contained in the target image is determined. In this way, the set of heat maps is processed based on the shape constraint corresponding to a part of the garment, so that the accurate recognition of the position probability of the key feature point contained in the garment to be recognized may be optimized, the accurate recognition of the garment may be implemented according to the determined position probability information of the key feature points of the garment to be recognized, and it may be applied more widely in the fields of online shopping, intelligent wearing, garment design etc., through the acquisition of the key feature points of the garment.

In an embodiment, the method includes the following operations before acquiring the target image containing the garment to be recognized.

An image training set containing training images of multiple garments is acquired, the training image includes an original image carrying marking information of the key feature points.

An initial convolutional neural network is trained iteratively based on the image training set, until a loss function meets a convergence condition, to obtain the trained first neural network.

Acquiring the image training set containing training images of multiple garments may be constructing multiple batches of training sets for the sample image based on a new image. For example, the training images may be collected based on an image library disclosed currently in the Internet, and the training images are clarified by marking local images in the original image according to a predetermined marking method.

Here, the loss function, also known as the cost function, is the objective function to be optimized by the neural network. The process of training or optimizing the neural network is the process of minimizing the loss function. The smaller the value of the loss function, the closer the value of the corresponding prediction result to the value of the real result.

In the embodiment of the disclosure, an initial neural network model may be a pre-trained neural network model based on a pre-trained image data set, for example, a convolutional neural network model such as Inception V1, V2, V3 and V4 etc. obtained by pre-training based on a pre-trained image data set such as ImageNet, DenseNet etc. Of course, the initial neural network model may be constructed by using parameters of a pre-trained neural network model on the pre-trained image data set, based on any pre-trained neural network model on other pre-trained image data sets.

Figure 3:
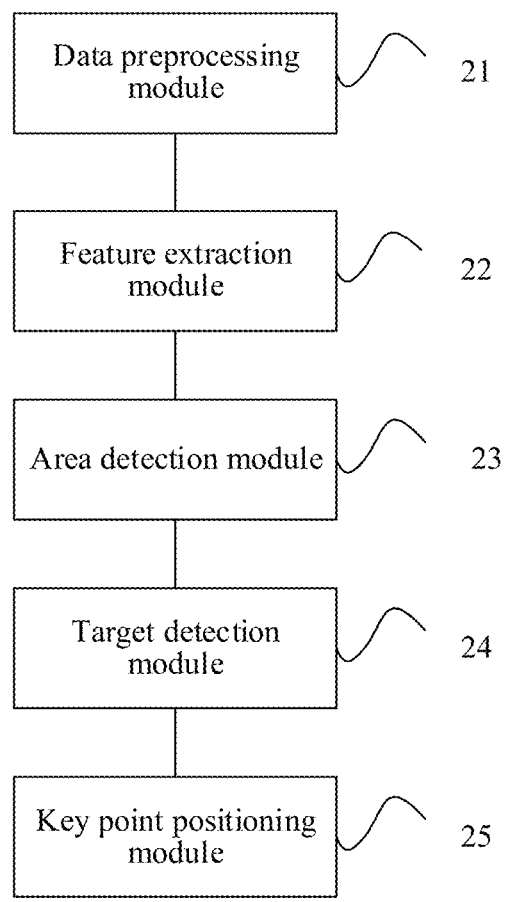
FIG. 3 is a schematic structural diagram of a first neural network provided according to an embodiment of the disclosure.

Specifically, referring to FIG. 3, the first neural network may include a data preprocessing module 21, a feature extraction module 22, an area detection module 23, a target detection module 24 and a key point positioning module 25.

The feature extraction module 22 is configured to extract and output an image feature map from a target image data, initialize a feature extraction network with ImageNet network parameters, extract feature maps from outputs of a first convolutional layer, a second unit of a first residual block, a third unit of a second residual block, a fifth unit of a third residual block and the last unit of a fourth residual block respectively, and perform up-sampling and channel transformation on the feature maps sequentially, and then add the feature maps to a corresponding position of a previous level feature map to perform 3×3 convolution once to eliminate superimposition and folding effects, thereby constructing a multi-scale feature pyramid, the scales of which are 2, 4, 8, 16, 32 times respectively. The multi-scale feature helps to detect objects of different scales, so that the whole detection method is more robust.

The area detection module 23 is configured to perform the following processings on the feature map with each scale respectively: firstly, performing feature adjustment of one 3×3 convolution, then connecting two fully connected branches, one of the branches is used for predicting the position of the object, and another of the branches is used for predicting the probability of the object. In order to further increase the robustness of the prediction, several reference boxes are introduced for each pixel, the boxes have different aspect ratios and scales. The decision is made based on each reference box, so that the decision granularity is refined, and a dense reference box makes full use of a wider collective wisdom and reduces the instability of the prediction. At the time of training, firstly, an object boundary box with the largest overlapping area ratio with each reference box is found as a supporting object of the corresponding reference box. Each reference box supports or votes only one object. If the overlapping area. ratio with the supporting object is larger than a specified threshold value, the reference box is regarded as a positive sample, otherwise, the reference box is regarded as a negative sample (the reference box with the overlapping area ratio larger than zero is more capable of distinguishing the boundary of the object than the reference box without the overlapping area ratio), and in order to increase the density, the reference box with the largest overlapping area ratio with each object boundary box is further designated as the positive sample. At the time of training, in order to reduce the amount of calculation, it is necessary to filter out a part of the reference boxes in each iteration. The area of the object boundary box predicted by these reference boxes is small and the score thereof is low. Then, a part of the reference boxes are further eliminated by a non-maximum compression method. Then, a part of the boundary boxes are filtered out again according to the threshold value of the overlapping area ratio between the predicted object boundary box and the marked object boundary box. Finally, those boundary boxes located in the positive and negative sample sets are selected to participate in the final calculation of the loss function. At the time of testing, non-maximum compression is performed on the position and the object score of the object boundary box predicted by each reference box, and an optimal object instance and object position are selected. Finally, it is necessary to merge the object areas predicted by each scale feature map, which are adjusted to the original image size. Each predicted object area is regarded as an area of interest, and the feature map of the area is scaled to 14×14 size by bi-linear interpolation and output to the target detection module 24.

The target detection module 24 is configured to perform maximum pooling on an input object feature map with a fixed size 14×14 to have a size 7×7, then expand the feature map into a one-dimensional vector, then connect two fully connected layers to perform feature transformation, and finally divide it into two branches, each branch being a fully connected layer for fining object position and categorizing objects respectively. At the time of training, the object boundary box is the same as that of the area detection module 23, that is, the minimum outer bounding box of all the key points of the object class.

The key point positioning module 25 is configured to perform 3×3 convolution feature transformation successively on the 14×14 object feature map output by the area detection module 23 for four times to output a new feature map with the same size, then perform deconvolution once so that the size of the feature map is 28×28, and finally apply channel transformation and sigmoid activation so that the number of channels, that is, the number of key points, is 22, and each channel corresponds to one key point heat map.

Training an initial convolutional neural network iteratively based on the image training set, until a loss function meets a convergence condition, to obtain the trained first neural network, refers to: inputting the image training set into the initial convolutional neural network for iterative training, calculating a cost through forward conduction and by using marking information and the loss function, and updating parameters in each layer through a back propagation loss function gradient to adjust weights of the initial convolutional neural network, until the loss function of the initial convolutional neural network meets the convergence condition, to obtain the trained first neural network.

In the above embodiment, the initial convolutional neural network is trained iteratively based on the acquisition of the image training set including training images of multiple garments, and the trained first neural network for performing garment recognition on the target image is constructed. The training method is simple and solves the problems of few training samples for garment recognition and slow operation.

In an embodiment, the method further includes the following operation before training the initial convolutional neural network iteratively based on the image training set.

Image augmentation is performed on the original image to obtain a corresponding augmented image, the image training set further includes the augmented image.

Further, the performing image augmentation on the original image to obtain the corresponding augmented image includes the following operation.

At least one of image horizontal translation, image vertical translation, color perturbation or image rotation is performed on the original image respectively, to obtain the corresponding augmented image.

Here, the performing image augmentation on the original image to obtain the corresponding augmented image, refers to increasing the amount of data without changing the category of the original image. The augmentation of the original image includes multiple aspects, such as horizontal translation, vertical translation and image rotation from a geometric viewpoint, and color perturbation from a pixel transform viewpoint.

In the above embodiment, the image augmentation is performed on the original image in different ways to obtain the augmented image, so that samples of the augment image training set increase the amount of data. In this way, when the initial convolutional neural network is trained iteratively by the image training set, the generalization ability of the model may be improved greatly, and the garment may be recognized more accurately.

In an embodiment, the method further includes the following operations after obtaining the trained first neural network.

A set of training samples including the set of heat maps corresponding to the key feature points contained in the target image output by the first neural network is acquired.

An initial bi-directional cyclic convolutional neural network is trained iteratively based on the set of training samples and a set of shape constraints, until a loss function meets a convergence condition to obtain the trained second neural network.

Here, the loss function, also known as the cost function, is the objective function of optimization of the neural network. The process of training or optimization of the neural network is the process of minimizing the loss function. The smaller the value of the loss function, the closer the value of the corresponding prediction result to the value of the real result.

Figure 4:
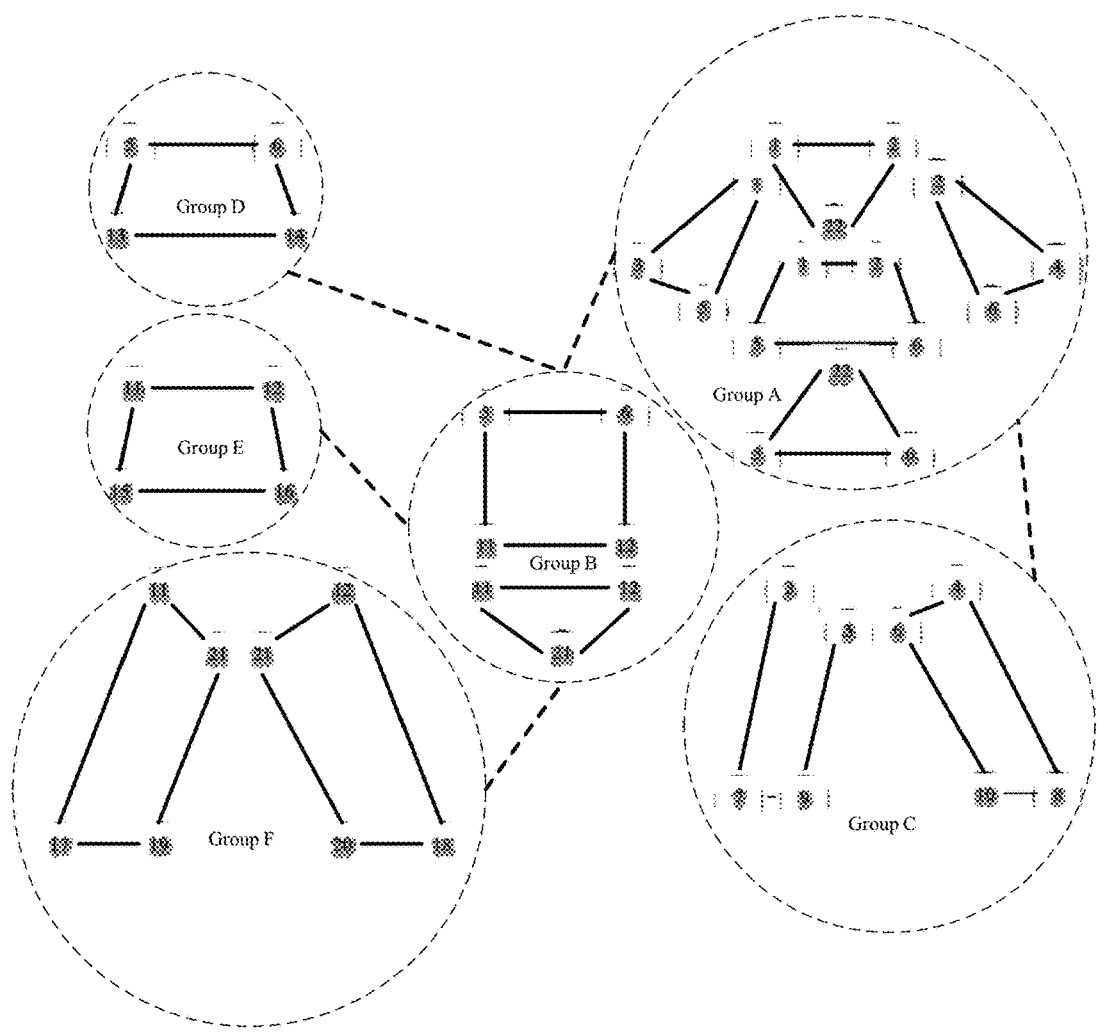
FIG. 4 is a schematic diagram of a set of shape constraints provided according to an embodiment of the disclosure.

Here, referring to FIG. 4, the set of shape constraints is obtained by modeling deformation structures specific to the key points of the garment, and descriptions of node numbers are illustrated in Table 1. These shapes and structures are designed to conform to the garment design characteristics and human dynamics, and may synthesize the advantages of joint models in the bone system and model the local deformation constraint relationships of the key points of the garment more adequately.

TABLE 1

| Node No. | Name |
| --- | --- |
| 1 | Left neck |
| 2 | Right neck |
| 3 | Left shoulder |
| 4 | Right shoulder |
| 5 | Left axillary fossa |
| 6 | Right axillary fossa |
| 7 | Left cuff, outer |
| 8 | Right cuff, outer |
| 9 | Left cuff, inner |
| 10 | Right cuff, inner |
| 11 | Left waist |
| 12 | Right waist |
| 13 | Left hem |
| 14 | Right hem |
| 15 | Left skirt hem |
| 16 | Right skirt hem |
| 17 | Left trouser leg, outer |
| 18 | Right trouser leg, outer |
| 19 | Left trouser leg, inner |
| 20 | Right trouser leg, inner |
| 21 | Crotch |
| 22 | Midline |

Further, the set of shape constraints includes shape constraints formed by characterizing constraint relationships between multiple key feature points with at least one of triangular substructure or quadrilateral substructure respectively.

Here, referring to FIG. 4 again, the set of shape constraints mainly includes characterizing the constraint relationships between multiple key feature points with by at least one of triangular substructure or quadrilateral substructure respectively, which have the characteristics of incomplete stability and complete stability respectively. The combination of the incomplete stability and complete stability makes the whole global structure highly flexibly deformable and capable of adequately modeling the global loose constraint relationship; in addition, each symmetrical shape constraint also has the characteristic of symmetry, and the design excavates the structural characteristic of the garment; furthermore, different shape constraints also have the characteristic of local area symmetry there-between, such as the left sleeve and the right sleeve, but this characteristic is weaker, because they are not completely connected together, but are carried out through different shape constraints; finally, different sets of shape constraints may also model human-specific topological constraint relationships, such as shoulder, chest, abdomen, etc. Therefore, single shape constraint may model local deformation constraints adequately, and different sets of shape constraints may implement the global loose constraint relationship, their synthesis makes the whole design have the advantage of global optimization.

Here, the bi-directional cyclic convolutional neural network RNN is an initial neural network model, and dependencies between sequences may be captured more easily from data mainly based on the bi-directional cyclic convolutional neural network, unlike the dependency patterns or configuration compatibility functions between key points that need to be designed manually in a conditional random field.

The training the initial bi-directional cyclic convolutional neural network iteratively based on the set of training samples and the set of shape constraints, until the loss function meets the convergence condition to obtain the trained second neural network, refers to inputting the set of training samples and the set of shape constraints into the bi-directional cyclic convolutional neural network for iterative training, calculating a cost through forward conduction and by using marking information and the loss function, and updating parameters in each layer through a back propagation loss function gradient to adjust weights of the bi-directional cyclic convolutional neural network, until the loss function of the bi-directional cyclic convolutional neural network meets the convergence condition, to obtain the trained second neural network.

In the above embodiment, the initial bi-directional cyclic convolutional neural network is trained iteratively based on the set of training samples and the set of shape constraints, until the loss function meets the convergence condition to obtain the trained second neural network. The training method is simple and the accuracy and speed of garment recognition are improved.

In an embodiment, the method further includes the following operation before processing the set of heat maps through the trained second neural network based on the shape constraint corresponding to the target image.

The shape constraint corresponding to the target image is determined according to the set of heat maps corresponding to the key feature points contained in the target image, the target image includes at least one shape constraint.

Determining shape constraint corresponding to the target image according to the set of heat maps corresponding to the key feature points contained in the target image, refers to determining the key feature points of the target image output from the first neural network, and then finding the shape constraint corresponding to the key feature points from the set of shape constraints For example, if it is determined that the key feature points contained in the target image include 5, it may be known by referring to FIG. 4 that the shape constraints included therein include the shape constraint 5-6-13-14, the shape constraint 1-3-5, the shape constraint 1-2-5-6, the shape constraint 22-5-6, the shape constraint 5-6-11-12 and the shape constraint 3-5-7-9.

In this way, the corresponding shape constraint is determined according to the key feature points contained in the target image, and the loose constraint characteristics between a part of areas of the garment are effectively captured.

In an embodiment, the training the initial bi-directional cyclic convolutional neural network iteratively based on the set of training samples and the set of shape constraints includes the following operations.

The set of training samples and the set of shape constraints are input into the initial bi-directional cyclic convolutional neural network.

The bi-directional cyclic convolutional neural network inputs each shape constraint in the set of shape constraints into a forward layer in a set order, and inputs each shape constraint in the set of shape constraints into a backward layer in a set reverse order, for iterative training.

Referring to FIG. 4 again, the set of shape constraints may be divided into multiple shape constraint groups, such as Group A, Group B, Group C, Group D, Group E and Group F. Herein, each shape constraint group includes multiple shape constraints, and for the shape constraint groups, the shape constraint group having the key feature points coincided may continue to be divided into multiple shape constraints, so that no key feature points are repeated within the shape constraint group, and symmetrical requirements are taken into account at, the same time, for example, two shape constraints 1-3-5 and 2-4-6 within Group A may be put into a subgroup of Group A, and the remaining three shape constraints are each put into one subgroup.

Each shape constraint in the set of shape constraints is input into the forward layer in the set order, and each shape constraint in the set of shape constraints is input into the backward layer in the set reverse order, for iterative training the bi-directional cyclic convolutional neural network. Referring to a specific embodiment, inputting each shape constraint in the set of shape constraints into the forward layer in the set order, refers to inputting into the forward layer in the order of A-B-C-D-E-F. If a subgroup is included in each group, a subgroup is randomly selected to be optimized until the optimization of the subgroup is completed, and then the next group is optimized. It should be noted here that a global shape constraint split list needs to be maintained to prevent selecting the same key point as a split node. Inputting each shape constraint in the set of shape constraints into the backward layer in the set reverse order, refers to optimizing each group again in the reverse order with the group F-E-D-C-B-A, performing message propagation, and iterating multiple rounds successively so that the dependency constraint is globally propagated finally, and finally obtaining a new key feature point hot map which is constrained by the set of local shape constraints, here the new key point hot map refers to the position probability information of the key feature points contained in the target image. These heat maps are integrated adequately with likelihood and priori knowledge and have fine spatial positioning. The input is a preliminary predicted set of key feature point heat maps, i.e., position probability heat maps respectively corresponding to the key feature points as included, and a new set of key feature point heat maps is output after repeated iterations on the set of RNN shape constraints according to the above algorithm.

In an embodiment, the inputting each shape constraint in the set of shape constraints into the forward layer in the set order, and inputting each shape constraint in the set of shape constraints into the backward layer in the set reverse order for iterative training the bi-directional cyclic convolutional neural network includes the following operation.

In an iteration, for the bi-directional cyclic convolutional neural network, connecting order of the key feature points is set according to constraint relationships among the key feature points contained in a corresponding shape constraint.

A key feature point contained in the set of heat maps corresponding to the training image is taken as a starting point, position probability heat maps respectively corresponding to the key feature points are input into the forward layer and the backward layer according to the connecting order and a reverse order of the connecting order at the same time, for iterative training.

Figure 5:
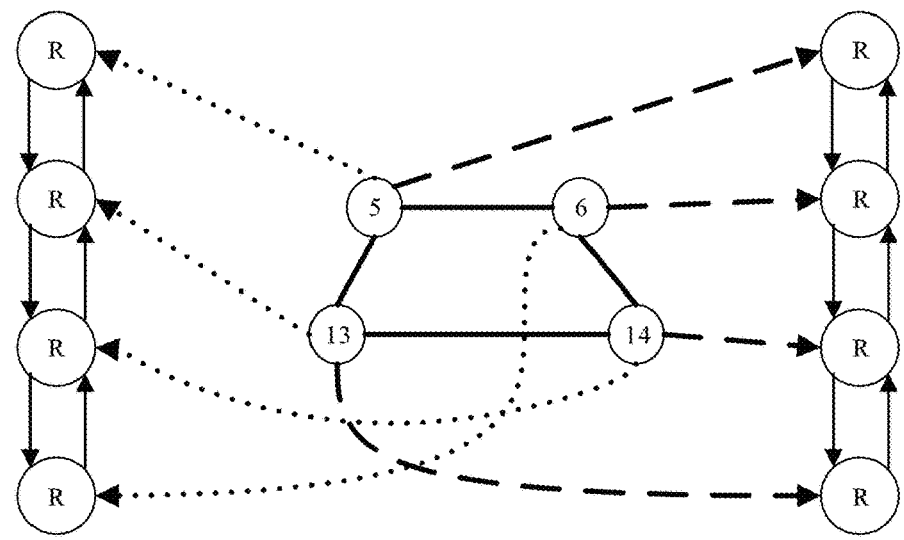
FIG. 5 is a schematic diagram of a shape constraint input into a bi-directional cyclic convolutional neural network provided according to an embodiment of the disclosure.

Here, for each shape constraint, it means that the shape constraint characteristic between a part of the key feature points is a ring-shaped structure, the ring dependency cannot be modeled directly by using the RNN. Here, each shape constraint is split into two RNNs to be modeled separately. As illustrated in FIG. 5, the inputting each shape constraint in the set of shape constraints into the forward layer in the set connecting order (5-6-14-13), and inputting each shape constraint in the set of shape constraints into the backward layer in the reverse order of the connecting order (5-13-14-6), for iterative training the bi-directional cyclic convolutional neural network refers to at the initial time, selecting a node from each shape constraint randomly as a starting node, and decomposing it into two chains in clockwise and counterclockwise directions respectively, and each of the chains corresponds to a bi-directional RNN. Here, in order to promote the global propagation of the dependency, the selection of the initial point in the whole set of shape constraints should not be repeated, so that it is prevented that a part of nodes are difficult to learn sufficient constraints, causing failure of the global message propagation.

In an embodiment, the processing the set of heat maps through the trained second neural network based on the shape constraint corresponding to the target image, and determining the position probability information of the key feature points contained in the target image include the following operations.

A display parameter of the set of heat maps is adjusted by the second neural network according to the shape constraint corresponding to the target image.

The display parameter of the set of heat maps is adjusted according to a condition to be met by the display parameter, to obtain a corresponding target parameter, and the position probability information of the key feature points contained in the target image is obtained according to the target parameter.

The set of heat maps includes position probability heat maps respectively corresponding to the key feature points contained in the target image; taking the RNN being the second neural network as an example, each R node is a bi-directional RNN node, which receives a forward message $m_i^f$ and a backward message $m_i^b$ from an upper node and a lower node respectively, and then outputs a new confidence $y_i$ in combination with a node likelihood term $x_i$. Here, $h_{i-1}^f$ and $h_{i+1}^b$ are RNN dependencies transmitted in the forward and backward directions respectively, $b_h^f$ and $b_{h+1}^b$ are offset and play the function of value range alignment. The updated forward and backward RNN dependencies are $h_i^f$ and $h_i^b$ respectively. For specific planning, please refer to the following equations (1) to (5).

$$m_i^f = \tanh(W^f * h_{i-1}^f + b_h^f) \quad (1)$$

$$m_i^b = \tanh(W^b * h_{i+1}^b + b_{h+1}^b) \quad (2)$$

$$y_i = \sigma(W^x * x_i + m_i^f + m_i^b) \quad (3)$$

$$h_i^f = \tanh(W^x * x_i + W^f * h_{i-1}^f + b_h^f) \quad (4)$$

$$h_i^b = \tanh(W^x * x_i + W^b * h_{i+1}^b + b_{h+1}^b) \quad (5)$$

Here, the symbol f represents the forward direction, which specifies the forward direction being from the node i−1 to the node i; the symbol b represents the backward direction, which specifies the backward direction being from the node i to the node i−1; $x_i$ represents the input original key point heat map i; $y_i$ represents an output new key point heat map i; $m_i^f$ represents the constraint relationship (conditional probability distribution) between the key point heat map i−1 and the key point heat map i, the term of the probability is confidence; $m_i^b$ represents the constraint relationship (conditional probability distribution) between the key point heat map i and the key point heat map i−1, the term of the probability is confidence; a new key point heat map $y_i$ is obtained after synthesizing information of the original key point heat map $x_i$, the forward key point constraint $m_i^f$ and the backward key point constraint $m_i^b$, $h_i^b$ and $h_i^f$ are internal states representing historical information in forward and backward directions respectively; $W^x$, $W^f$, $b_h^f$, $W^b$ and $b_{h+1}^b$ are generational estimation parameters.

Here, as a specific embodiment, referring to the shape constraint of group D in FIG. 4 again, the key feature point 5, the key feature point 6 and the key feature point 14 correspond to the key feature point heat map i−1, the key feature point heat map i and the key feature point heat map respectively. By optimizing the key feature points 6 through the trained second neural network, it need to obtain a posterior distribution, i.e., the key feature point 6 contained in the target image, by using priori knowledge, i.e., information on the forward constraint relationship between the key feature points 5 and 6, the backward constraint relationship between the key feature points 6 and 14, as well as the likelihood information, i.e., the original key feature point 6 output by the first neural network, and synthesizing the three kinds of information. In this way, it is possible to output a fine set of key point heat maps conforming to the shape constraints of a part of the garment.

Figure 6:
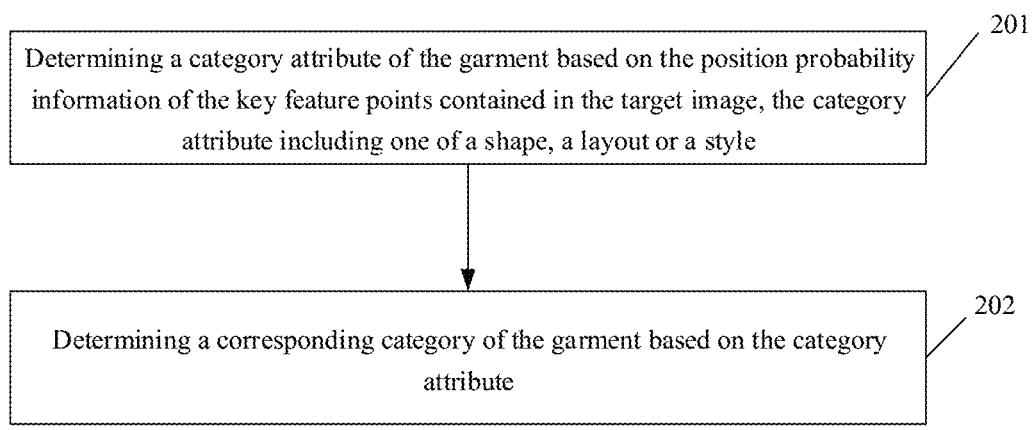
FIG. 6 is a schematic flow chart of a method for garment categorization provided according to an embodiment of the disclosure.

In another embodiment, as illustrated in FIG. 6, there is also provided a method for garment categorization, the method for garment categorization is performed by a device for garment categorization and includes the following operations.

In operation 201, a category attribute of the garment is determined based on the position probability information of the key feature points contained in the target image; herein the category attribute includes one of a shape, a layout or a style.

In operation 202, a corresponding category of the garment is determined based on the category attribute.

Here, the garment is recognized accurately based on the position probability information of the key feature points of the target image, and the category attribute corresponding to the garment is determined. For example, taking the category attribute being the shape as an example, if the garment is determined as a trouser, the garment is categorized into the trouser category. In this way, each target image is categorized according to the shape, the layout and the style. For example, a user performs network shopping and may categorize pictures provided by merchants. When a keyword 'trouser' is input, all sets of target images belonging to the garment category may be displayed, thereby providing a more convenient and quick experience for shopping. Further, for categorization of the garment, for example, trousers are divided into calf-leg pants, straight-leg pants and wide-leg pants according to the layout, and skirts are divided into short skirts, ultra-short skirts, over-knee skirts and long skirts according to the style. In this way, it not only enriches the categorization options, but also provides more materials for the field of garment design and intelligent wearing, and may be applied more widely in the fields of online shopping, intelligent wearing, garment design etc.

Figure 7:
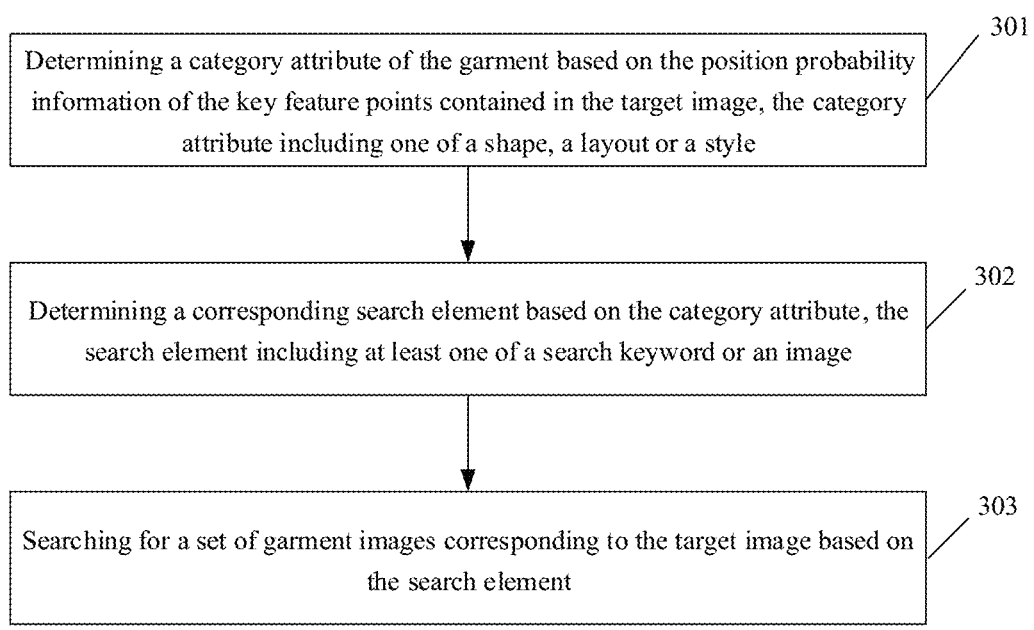
FIG. 7 is a schematic flow chart of a method for garment searching provided according to an embodiment of the disclosure.

In another embodiment, as illustrated in FIG. 7, there is also provided a method for garment searching, the method for garment searching is performed by a device for garment searching and includes the following operations.

In operation 301, a category attribute of the garment is determined based on the position probability information of the key feature points contained in the target image; herein the category attribute includes one of a shape, a layout or a style.

In operation 302, a corresponding search element is determined based on the category attribute. Herein the search element includes at least one of a search keyword or an image.

In operation 303, a set of garment images corresponding to the target image is searched based on the search element.

Here, the garment is recognized accurately based on the position probability information of the key feature points of the target image, and the category attribute corresponding to the garment is determined. For example, taking the category attribute being the shape as an example, if the garment is determined as a trouser, the garment is categorized into the trouser category.

Determining a corresponding search element based on the category attribute refers to if the garment is determined as a trouser, the generated search element being at least one of a search keyword 'trouser' or 'trouser image' corresponding to the trouser, and then performing a matching query with the image features stored in the image feature pool. Here, according to the queried result of garments, the queried similar garment pictures and corresponding garment information are displayed to the user through a mobile terminal, and the garment information includes a brand, price and material of the garment. In this way, searching the garment based on the target image effectively solves the difficulty that the user cannot or is not willing to search the garment with the text, reduces the difficulty of shopping, the visualization characteristic meets higher requirements of the user for the search function, facilitates the user to find the garment information quickly, and greatly improves the user experience. Meanwhile, the category attribute divides trousers into calf-leg pants, straight-leg pants and wide-leg pants according to the layout, and divides skirts into short skirts, ultra-short skirts, over-knee skirts and long skirts according to the style. In this way, at the time of searching the garments, more detailed searching is achieved, the searching difficulty of the user is also smaller, and the screening accuracy is also more accurate. Further, it provides more materials for the field of garment design and intelligent wearing, and may be applied more widely in the fields of online shopping, intelligent wearing, garment design etc.

Figure 8:
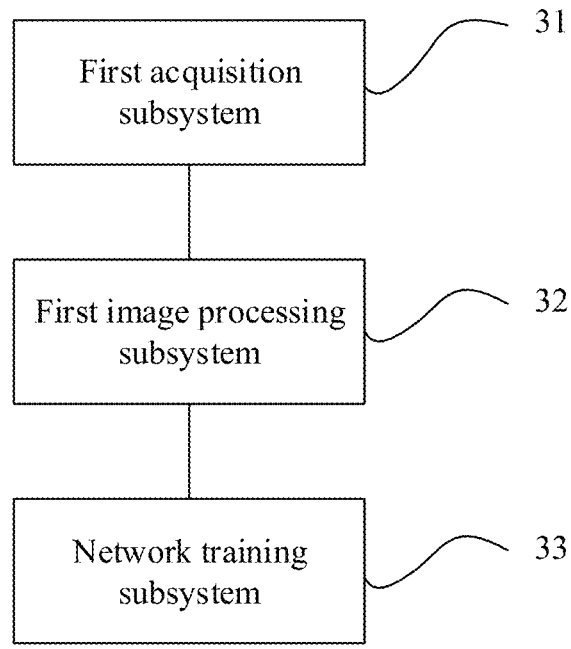
FIG. 8 is a schematic structural diagram of a device for a garment recognition provided according to an embodiment of the disclosure.

In another embodiment, as illustrated in FIG. 8, there is also provided a device for a garment recognition, the device includes a first acquisition subsystem 31, a first image processing subsystem 32.

The first acquisition subsystem 31 is configured to acquire a target image containing a garment to be recognized.

The first image processing subsystem 32 is configured to process the target image by a trained first neural network, determine a set of heat maps corresponding to key feature points contained in the target image, the set of heat maps including position probability heat maps respectively corresponding to the key feature points contained in the target image; and to process the set of heat maps by a trained second neural network based on a shape constraint corresponding to the target image to determine position probability information of the key feature points contained in the target image.

In the above embodiment of the disclosure, the target image containing the garment to be recognized is acquired, the target image is processed by the trained first neural network, and the set of heat maps corresponding to the key feature points contained in the target image is determined, the set of heat maps includes position probability heat maps respectively corresponding to the key feature points contained in the target image. In this way, initial position information of each of the key feature points in the target image of the garment to be recognized is acquired, and initial position probability heat maps respectively corresponding to the key feature points are obtained; and the set of heat maps is processed by the trained second neural network based on the shape constraint corresponding to the target image, and position probability information of the key feature points contained in the target image is determined. In this way, the set of heat maps is processed based on the shape constraint corresponding to a part of the garment, so that the accurate recognition of the position probability of the key feature point contained in the garment to be recognized may be optimized, the accurate recognition of the garment may be implemented according to the determined position probability information of the key feature points of the garment to be recognized, and it may be applied more widely in the fields of online shopping, intelligent wearing, garment design etc., through the acquisition of the key feature points of the garment.

In an embodiment, the device further includes a network training subsystem 33 configured to acquire an image training set containing training images of multiple garments, the training image including an original image carrying marking information of the key feature points; and train an initial convolutional neural network iteratively based on the image training set, until a loss function meets a convergence condition, to obtain the trained first neural network.

In an embodiment, the network training subsystem 33 is further configured to perform image augmentation on the original image to obtain a corresponding augmented image, the image training set further includes the augmented image.

In an embodiment, the network training subsystem 33 is further configured to perform at least one of image horizontal translation, image vertical translation, color perturbation or image rotation on the original image, to obtain the corresponding augmented image.

In an embodiment, the network training subsystem 33 is further configured to acquire a set of training samples including the set of heat maps corresponding to the key feature points contained in the target image output by the first neural network; and train an initial bi-directional cyclic convolutional neural network iteratively based on the set of training samples and a set of shape constraints, until a loss function meets a convergence condition to obtain the trained second neural network.

In an embodiment, the network training subsystem 33 is further configured to input the set of training samples and the set of shape constraints into the initial bi-directional cyclic convolutional neural network; and input each shape constraint in the set of shape constraints into a forward layer in a set order, and input each shape constraint in the set of shape constraints into a backward layer in a set reverse order, for iterative training the bi-directional cyclic convolutional neural network.

In an embodiment, the network training subsystem 33 is further configured to in an iteration, for the bi-directional cyclic convolutional neural network, set connecting order of the key feature points according to constraint relationships among the key feature points contained in a corresponding shape constraint; and take a key feature point contained in the set of heat maps corresponding to the training image as a starting point, input position probability heat maps respectively corresponding to the key feature points into the forward layer and the backward layer according to the connecting order and a reverse order of the connecting order at the same time, for iterative training.

It should be noted that in practical applications, the first acquisition subsystem 31 may be implemented by a camera or a terminal having a drawing function, the first image processing subsystem 32 may be implemented by an image processor or a server, and the network training subsystem 33 may be implemented by a processor or a server; a camera, a terminal having a drawing function, an image processor, a server and a processor are not illustrated in FIG. 8; herein the image processor or processor is specifically a Central Processing Unit (CPU), a Microprocessor Unit (MPU), a Digital Signal Processor (DSP), or a Field Programmable Gate Array (FPGA).

Figure 9:
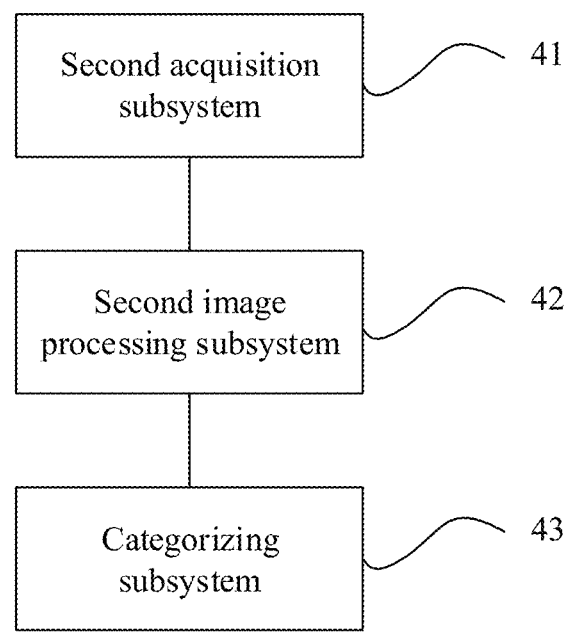
FIG. 9 is a schematic structural diagram of a device for garment categorization provided according to an embodiment of the disclosure.

In another embodiment, as illustrated in FIG. 9, there is also provided a device for garment categorization, the device includes a second acquisition subsystem 41, a second image processing subsystem 42, and a categorizing subsystem 43.

The second acquisition subsystem 41 is configured to acquire a target image containing a garment to be recognized.

The second image processing subsystem 42 is configured to determine, based on the target image, a set of heat maps corresponding to key feature points contained in the target image, the set of heat maps including position probability heat maps respectively corresponding to the key feature points contained in the target image; and to process the set of heat maps based on a shape constraint corresponding to the target image to determine position probability information of the key feature points contained in the target image.

The categorizing subsystem 43 is configured to determine a category attribute of the garment based on the position probability information of the key feature points contained in the target image; herein the category attribute includes one of a shape, a layout or a style; and to determine a corresponding category of the garment based on the category attribute.

Figure 10:
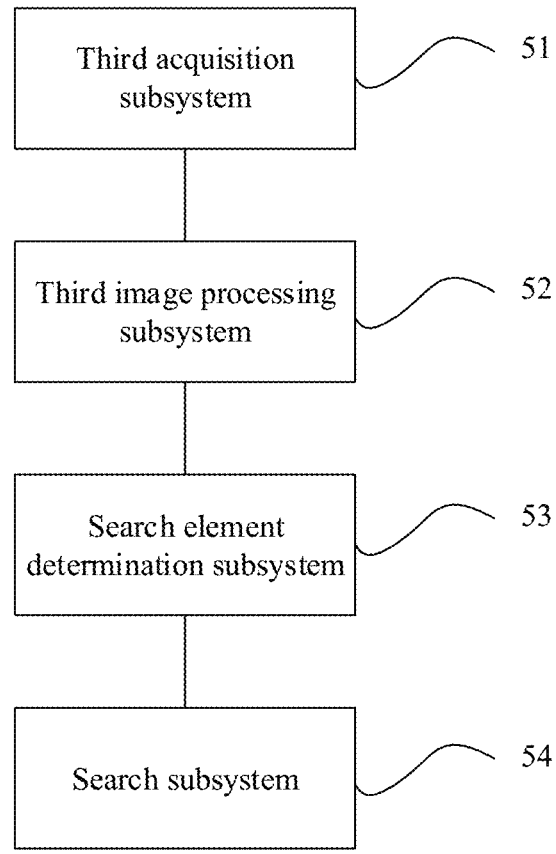
FIG. 10 is a schematic structural diagram of a device for garment searching provided according to an embodiment of the disclosure.

It should be noted that in practical applications, the second acquisition subsystem 41 may be implemented by a camera or a terminal having a drawing function, the second image processing subsystem 42 may be implemented by an image processor or a server, and the categorizing subsystem 43 may be implemented by a processor or a server; a camera, a terminal having a drawing function, an image processor, a server and a processor are not illustrated in FIG. 9, In another embodiment, as illustrated in FIG. 10, there is also provided a device for garment searching, the device includes a third acquisition subsystem 51 and a third image processing subsystem 52, a search element determination subsystem 53 and a search subsystem 54.

The third acquisition subsystem 51 is configured to acquire a target image containing a garment to be recognized.

The third image processing subsystem 52 is configured to determine, based on the target image, a set of heat maps corresponding to key feature points contained in the target image, the set of heat maps including position probability heat maps respectively corresponding to the key feature points contained in the target image; and to process the set of heat maps based on a shape constraint corresponding to the target image to determine position probability information of the key feature points contained in the target image.

The search element determination subsystem 53 is configured to determine a category attribute of the garment based on the position probability information of the key feature points contained in the target image; herein the category attribute includes one of a shape, a layout or a style; and to determine a corresponding search element based on the category attribute; herein the search element includes at least one of a search keyword or an image.

The search subsystem 54 is configured to search a set of garment images corresponding to the target image based on the search element.

It should be noted that in practical applications, the third acquisition subsystem 51 may be implemented by a camera or a terminal having a drawing function, the third image processing subsystem 52 may be implemented by an image processor or a server, the search element determination subsystem 53 may be implemented by a processor or a server, and the search subsystem 54 may be implemented by a search engine device; a camera, a terminal having a drawing function, an image processor, a server, a processor and a search engine device are not illustrated in FIG. 10.

Figure 11:
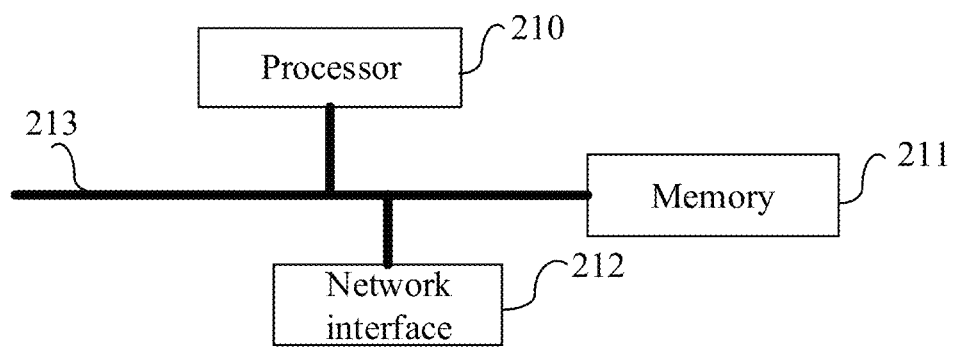
FIG. 11 is a schematic structural diagram of a computer device provided according to an embodiment of the disclosure.

In another embodiment, as illustrated in FIG. 11, there is also provided a computer device including at least one processor 210 and a memory 211 configured to store a computer program executable on the processor 210; herein the processor 210 illustrated in FIG. 11 is not intended to refer to the number of processors being one, but only intended to refer to the positional relationship of the processors with respect to other devices. In practical applications, the number of processors may be one or more. Similarly, the same meaning also applies to the memory 211 illustrated in FIG. 11, that is, it is only intended to refer to the positional relationship of the memory with respect to other devices. In practical applications, the number of memories may be one or more.

Herein the processor 210 is configured to perform the following steps when executing the computer program:

acquiring a target image containing a garment to be recognized, processing the target image by a trained first neural network, and determining a set of heat maps corresponding to key feature points contained in the target image, the set of heat maps including position probability heat maps respectively corresponding to the key feature points contained in the target image; and processing the set of heat maps by a trained second neural network based on a shape constraint corresponding to the target image, and determining position probability information of the key feature points contained in the target image.

In an optional embodiment, the processor 210 is further configured to perform the following steps when executing the computer program:

acquiring an image training set containing training images of multiple garments, the training image including an original image carrying marking information of the key feature points; and training an initial convolutional neural network iteratively based on the image training set, until a loss function meets a convergence condition, to obtain the trained first neural network.

In an optional embodiment, the processor 210 is further configured to perform the following steps when executing the computer program:

performing image augmentation on the original image to obtain a corresponding augmented image, the image training set further including the augmented image.

In an optional embodiment, the processor 210 is further configured to perform the following steps when executing the computer program:

performing at least one of image horizontal translation, image vertical translation, color perturbation or image rotation on the original image, to obtain the corresponding augmented image.

In an optional embodiment, the processor 210 is further configured to perform the following steps when executing the computer program:

acquiring a set of training samples including the set of heat maps corresponding to the key feature points contained in the training image output by the first neural network; and training an initial bi-directional cyclic convolutional neural network iteratively based on the set of training samples and a set of shape constraints, until a loss function meets a convergence condition to obtain the trained second neural network.

In an optional embodiment, the processor 210 is further configured to perform the following steps when executing the computer program:

the set of shape constraints includes shape constraints formed by characterizing constraint relationships between multiple key feature points with at least one of triangular substructure or quadrilateral substructure respectively.

In an optional embodiment, the processor 210 is further configured to perform the following steps when executing the computer program:

determining the shape constraint corresponding to the target image according to the set of heat maps corresponding to the key feature points contained in the target image, the target image including at least one shape constraint.

In an optional embodiment, the processor 210 is further configured to perform the following steps when executing the computer program:

inputting the set of training samples and the set of shape constraints into the initial bi-directional cyclic convolutional neural network; and inputting each shape constraint in the set of shape constraints into a forward layer in a set order, and inputting each shape constraint in the set of shape constraints into a backward layer in a set reverse order, for iterative training the bi-directional cyclic convolutional neural network.

In an optional embodiment, the processor 210 is further configured to perform the following steps when executing the computer program:

in an iteration, for the bi-directional cyclic convolutional neural network, setting connecting order of the key feature points according to constraint relationships among the key feature points contained in a corresponding shape constraint; and taking a key feature point contained in the set of heat maps corresponding to the training image as a starting point, inputting position probability heat maps respectively corresponding to the key feature points into the forward layer and the backward layer according to the connecting order and a reverse order of the connecting order at the same time, for iterative training.

In an optional embodiment, the processor 210 is further configured to perform the following steps when executing the computer program:

adjusting, by the second neural network, a display parameter of the set of heat maps, according to the shape constraint corresponding to the target image; and adjusting the display parameter of the set of heat maps according to a condition to be met by the display parameter, to obtain a corresponding target parameter, and obtaining the position probability information of the key feature points contained in the target image according to the target parameter.

The device for a garment recognition further includes at least one network interface 212. Various components in the transmitter are coupled together by a bus system 213. It should be appreciated that bus system 213 is used to implement connection communication between these components. The bus system 213 includes, in addition to a data bus, a power bus, a control bus and a status signal bus. However, for clarity of illustration, various buses are labeled as the bus system 213 in FIG. 11.

Herein the memory 211 may be a volatile memory or a non-volatile memory, and may also include both the volatile memory and the non-volatile memory. Herein the non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a Flash Memory, a magnetic surface memory, an optical disk, or a Compact Disc Read-Only Memory (CD-ROM); the magnetic surface memory may be a magnetic disk memory or a magnetic tape memory. The volatile memory may be a Random Access Memory (RAM), which functions as an external cache. By way of example, but not of limitation, many forms of RAMs are available, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), Direct Rambus Random Access Memory (DRRAM). The memory 211 described in the embodiment of the disclosure is intended to include, but is not limited to, these and any other suitable types of memories.

The memory 211 in the embodiment of the disclosure is configured to store various types of data to support the operation of the transmitting end. Examples of such data include any computer program for operating on the transmitting end, such as an operating system and an application. Herein the operating system includes various system programs, such as a framework layer, a core library layer, a driver layer, etc., for implementing various basic services and processing hardware-based tasks. The application may include various applications for implementing various application services. Here, the program for implementing the method of the embodiment of the disclosure may be included in the application.

The embodiment also provides a computer storage medium including, for example, the memory 211 having stored thereon a computer program, which may be executed by the processor 210 in the transmitting end to perform the steps described in the foregoing method. The computer storage medium may be a memory such as FRAM, ROM, PROM, EPROM, EEPROM, Flash Memory, magnetic surface memory, optical disk, or CD-ROM etc.; may also be various devices including one or any combination of the above memories, such as a smartphone, a tablet computer, a notebook computer etc. A computer storage medium has stored thereon a computer program, the computer program performs the following steps when being executed by a processor:

acquiring a target image containing a garment to be recognized, processing the target image by a trained first neural network, and determining a set of heat maps corresponding to key feature points contained in the target image, the set of heat maps including position probability heat maps respectively corresponding to the key feature points contained in the target image; and processing the set of heat maps by a trained second neural network based on a shape constraint corresponding to the target image, and determining position probability information of the key feature points contained in the target image.

In an optional embodiment, the computer program further performs the following steps when being executed by a processor:

acquiring an image training set containing training images of multiple garments, the training image including an original image carrying marking information of the key feature points; and training an initial convolutional neural network iteratively based on the image training set, until a loss function meets a convergence condition, to obtain the trained first neural network.

In an optional embodiment, the computer program further performs the following steps when being executed by a processor:

performing image augmentation on the original image to obtain a corresponding augmented image, the image training set further including the augmented image.

In an optional embodiment, the computer program further performs the following steps when being executed by a processor:

performing at least one of image horizontal translation, image vertical translation, color perturbation or image rotation on the original image, to obtain the corresponding augmented image.

In an optional embodiment, the computer program further performs the following steps when being executed by a processor:

acquiring a set of training samples including the set of heat maps corresponding to the key feature points contained in the target image output by the first neural network; and training an initial bi-directional cyclic convolutional neural network iteratively based on the set of training samples and a set of shape constraints, until a loss function meets a convergence condition to obtain the trained second neural network.

In an optional embodiment, the computer program further performs the following steps when being executed by a processor:

the set of shape constraints includes shape constraints formed by characterizing constraint relationships between multiple key feature points with at least one of triangular substructure or quadrilateral substructure respectively.

In an optional embodiment, the computer program further performs the following steps when being executed by a processor:

determining the shape constraint corresponding to the target image according to the set of heat maps corresponding to the key feature points contained in the target image, the target image including at least one shape constraint.

In an optional embodiment, the computer program further performs the following steps when being executed by a processor:

inputting the set of training samples and the set of shape constraints into the initial bi-directional cyclic convolutional neural network; and inputting each shape constraint in the set of shape constraints into a forward layer in a set order, and inputting each shape constraint in the set of shape constraints into a backward layer in a set reverse order, for iterative training the bi-directional cyclic convolutional neural network.

In an optional embodiment, the computer program further performs the following steps when being executed by a processor:

in an iteration, for the bi-directional cyclic convolutional neural network, setting connecting order of the key feature points according to constraint relationships among the key feature points contained in a corresponding shape constraint; and taking a key feature point contained in the set of heat maps corresponding to the training image as a starting point, inputting position probability heat maps respectively corresponding to the key feature points into the forward layer and the backward layer according to the connecting order and a reverse order of the connecting order at the same time, for iterative training.

In an optional embodiment, when the computer program is executed by a processor, the computer program further performs the following steps:

adjusting, by the second neural network, a display parameter of the set of heat maps, according to the shape constraint corresponding to the target image; and adjusting the display parameter of the set of heat maps according to a condition to be met by the display parameter, to obtain a corresponding target parameter, and obtaining the position probability information of the key feature points contained in the target image according to the target parameter.

The above descriptions are just preferred embodiments of the disclosure, and are not intended to limit the scope of the disclosure.

INDUSTRIAL PRACTICABILITY

In the embodiments of the disclosure, a target image containing a garment to be recognized is acquired and a set of heat maps corresponding to key feature points contained in the target image is determined based on the target image, the set of heat maps includes position probability heat maps respectively corresponding to the key feature points contained in the target image; in this way, initial position information of each of the key feature points in the target image of the garment to be recognized is acquired, and initial position probability heat maps respectively corresponding to the key feature points are obtained; and the set of heat maps is processed based on a shape constraint corresponding to the target image, and position probability information of the key feature points contained in the target image is determined. In this way, the set of heat maps is processed based on the shape constraint corresponding to a part of the garment, so that the accurate recognition of the position probability of the key feature point contained in the garment to be recognized may be optimized, the accurate recognition of the garment may be implemented according to the determined position probability information of the key feature points of the garment to be recognized, and it may be applied more widely in the fields of online shopping, intelligent wearing, garment design etc., through the acquisition of the key feature points of the garment.

What is claimed is:

1. A method for garment recognition, comprising:
acquiring a target image containing a garment to be recognized, and determining, based on the target image, a set of heat maps corresponding to key feature points contained in the target image, the set of heat maps comprising position probability heat maps respectively corresponding to the key feature points contained in the target image; and
processing the set of heat maps based on a shape constraint corresponding to the target image, to determine position probability information of the key feature points contained in the target image;
wherein determining, based on the target image, the set of heat maps corresponding to the key feature points contained in the target image comprises:
processing the target image through a trained first neural network to determine the set of heat maps corresponding to the key feature points contained in the target image,
and wherein processing the set of heat maps based on the shape constraint corresponding to the target image, to determine the position probability information of the key feature points contained in the target image comprises:
processing the set of heat maps through a trained second neural network based on the shape constraint corresponding to the target image, to determine the position probability information of the key feature points contained in the target image.

2. The method for garment recognition of claim 1, wherein the method further comprises: before acquiring the target image containing the garment to be recognized,
acquiring an image training set containing training images of a plurality of garments, the training image comprising an original image carrying marking information of the key feature points; and
training an initial convolutional neural network iteratively based on the image training set, until a loss function meets a convergence condition, to obtain the trained first neural network.

3. The method for garment recognition of claim 2, wherein the method further comprises: before training the initial convolutional neural network iteratively based on the image training set, performing image augmentation on the original image to obtain a corresponding augmented image, the image training set further comprising the augmented image.

4. The method for garment recognition of claim 3, wherein the performing image augmentation on the original image to obtain the corresponding augmented image comprises:
performing at least one of image horizontal translation, image vertical translation, color perturbation or image rotation on the original image, to obtain the corresponding augmented image.

5. The method for garment recognition of claim 2, wherein the method comprises: after obtaining the trained first neural network,
acquiring a set of training samples comprising the set of heat maps corresponding to the key feature points contained in the training images output by the first neural network; and
training an initial bi-directional cyclic convolutional neural network iteratively based on the set of training samples and a set of shape constraints, until a loss function meets a convergence condition to obtain the trained second neural network.

6. The method for garment recognition of claim 5, wherein the set of shape constraints comprises shape constraints formed by characterizing constraint relationships among a plurality of key feature points by using at least one of triangular substructure or quadrilateral substructure.

7. The method for garment recognition of claim 5, wherein the method comprises: before processing the set of heat maps through the trained second neural network based on the shape constraint corresponding to the target image,
determining the shape constraint corresponding to the target image according to the set of heat maps corresponding to the key feature points contained in the target image, the target image comprising at least one shape constraint.

8. The method for garment recognition of claim 5, wherein the training the initial bi-directional cyclic convolutional neural network iteratively based on the set of training samples and the set of shape constraints comprises:
inputting the set of training samples and the set of shape constraints into the initial bi-directional cyclic convolutional neural network; and
training the bi-directional cyclic convolutional neural network iteratively by inputting each shape constraint in the set of shape constraints into a forward layer in a set order and inputting each shape constraint in the set of shape constraints into a backward layer in a set reverse order.

9. The method for garment recognition of claim 8, wherein training the bi-directional cyclic convolutional neural network iteratively by inputting each shape constraint in the set of shape constraints into the forward layer in the set order and inputting each shape constraint in the set of shape constraints into the backward layer in the set reverse order comprises:
in an iteration, for the bi-directional cyclic convolutional neural network, setting connecting order of the key feature points according to constraint relationships among the key feature points contained in a corresponding shape constraint; and
taking a key feature point contained in the set of heat maps corresponding to the training image as a starting point, inputting position probability heat maps respectively corresponding to the key feature points into the forward layer and the backward layer according to the connecting order and a reverse order of the connecting order at the same time to perform training iteratively.

10. The method for garment recognition of claim 1, wherein the processing the set of heat maps through the trained second neural network based on the shape constraint corresponding to the target image, to determine the position probability information of the key feature points contained in the target image comprises:
adjusting, by the second neural network, a display parameter of the set of heat maps, according to the shape constraint corresponding to the target image; and
adjusting the display parameter of the set of heat maps according to a condition to be met by the display parameter, to obtain a corresponding target parameter, and obtaining the position probability information of the key feature points contained in the target image according to the target parameter.

11. The method for garment recognition of claim 1, further comprising:
determining a category attribute of the garment based on the position probability information of the key feature points contained in the target image; wherein the category attribute comprises one of a shape, a layout or a style; and determining a corresponding category of the garment based on the category attribute.

12. The method for garment recognition of claim 1, further comprising:

determining a category attribute of the garment based on the position probability information of the key feature points contained in the target image; wherein the category attribute comprises one of a shape, a layout or a style;

determining a corresponding search element based on the category attribute; wherein the search element comprises at least one of a search keyword or an image; and searching a set of garment images corresponding to the target image based on the search element.

13. A non-transitory computer storage medium having stored thereon a computer program that when executed by a processor, implements the method for garment recognition, the method comprising:

acquiring a target image containing a garment to be recognized, and determining, based on the target image, a set of heat maps corresponding to key feature points contained in the target image, the set of heat maps comprising position probability heat maps respectively corresponding to the key feature points contained in the target image; and processing the set of heat maps based on a shape constraint corresponding to the target image, to determine position probability information of the key feature points contained in the target image;

wherein determining, based on the target image, the set of heat maps corresponding to the key feature points contained in the target image comprises:

processing the target image through a trained first neural network, to determine the set of heat maps corresponding to the key feature points contained in the target image, and wherein processing the set of heat maps based on the shape constraint corresponding to the target image, to determine the position probability information of the key feature points contained in the target image comprises:

processing the set of heat maps through a trained second neural network based on the shape constraint corresponding to the target image, to determine the position probability information of the key feature points contained in the target image.

14. A device for garment recognition, comprising:

a processor and a memory configured to store a computer program executable on the processor;

wherein the processor is configured to execute the computer program to implement:

acquiring a target image containing a garment to be recognized, and determining, based on the target image, a set of heat maps corresponding to key feature points contained in the target image, the set of heat maps comprising position probability heat maps respectively corresponding to the key feature points contained in the target image; and processing the set of heat maps based on a shape constraint corresponding to the target image, to determine position probability information of the key feature points contained in the target image;

wherein determining, based on the target image, the set of heat maps corresponding to the key feature points contained in the target image comprises:

processing the target image through a trained first neural network to determine the set of heat maps corresponding to the key feature points contained in the target image, and wherein processing the set of heat maps based on the shape constraint corresponding to the target image, to determine the position probability information of the key feature points contained in the target image comprises:

processing the set of heat maps through a trained second neural network based on the shape constraint corresponding to the target image, to determine the position probability information of the key feature points contained in the target image.

15. The device for garment recognition of claim 14, wherein the processor is configured to execute the computer program to further implement: before acquiring the target image containing the garment to be recognized, acquiring an image training set containing training images of a plurality of garments, the training image comprising an original image carrying marking information of the key feature points; and training an initial convolutional neural network iteratively based on the image training set, until a loss function meets a convergence condition, to obtain the trained first neural network.

16. The device for garment recognition of claim 15, wherein the processor is configured to execute the computer program to further implement: before training the initial convolutional neural network iteratively based on the image training set, performing image augmentation on the original image to obtain a corresponding augmented image, the image training set further comprising the augmented image.

17. The device for garment recognition of claim 16, wherein the performing image augmentation on the original image to obtain the corresponding augmented image comprises:

performing at least one of image horizontal translation, image vertical translation, color perturbation or image rotation on the original image, to obtain the corresponding augmented image.

18. The device for garment recognition of claim 15, wherein the processor is configured to execute the computer program to further implement: after obtaining the trained first neural network, acquiring a set of training samples comprising the set of heat maps corresponding to the key feature points contained in the training images output by the first neural network; and training an initial bi-directional cyclic convolutional neural network iteratively based on the set of training samples and a set of shape constraints, until a loss function meets a convergence condition to obtain the trained second neural network.

* * * * *